(No Model.)

J. B. HYZER.
PLANT DUSTER.

No. 544,174. Patented Aug. 6, 1895.

WITNESSES
Geo. M. Anderson
Philip L. Masi

INVENTOR
J. B. Hyzer
by E. W. Anderson
his Attorney

UNITED STATES PATENT OFFICE.

JACOB B. HYZER, OF JANESVILLE, WISCONSIN.

PLANT-DUSTER.

SPECIFICATION forming part of Letters Patent No. 544,174, dated August 6, 1895.

Application filed May 2, 1895. Serial No. 547,870. (No model.)

*To all whom it may concern:*

Be it known that I, JACOB B. HYZER, a citizen of the United States, and a resident of Janesville, in the county of Rock and State of Wisconsin, have invented certain new and useful Improvements in Plant-Dusters; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
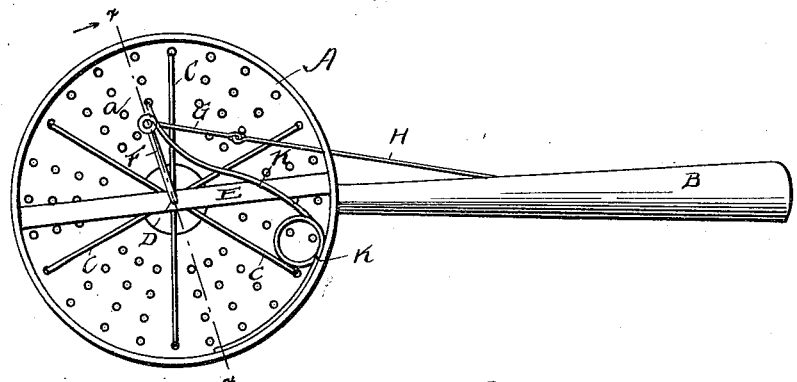
Figure 2:
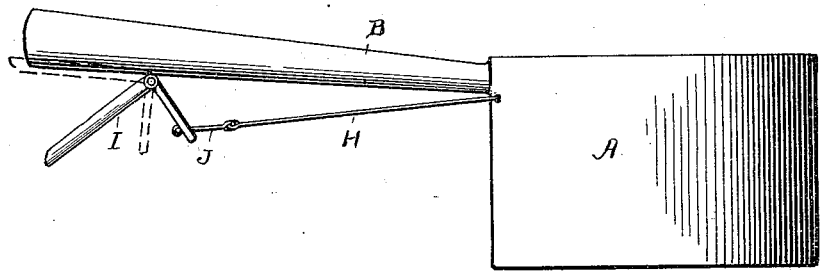
Figure 3:
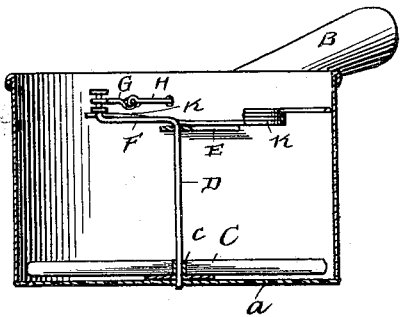

Figure 1 of the drawings is a representation of a plan of the invention. Fig. 2 is a side elevation of same, updrawn position of bell-crank lever shown in dotted lines. Fig. 3 is a section on line $x$ $x$, Fig. 1.

The object of this invention is to provide a simple and convenient device for dusting plants, it being especially designed for sifting flour mixed with paris green, or other poison in the form of a powder, upon potato-plants for the purpose of exterminating the Colorado beetles which prey thereon; and the invention consists in the novel construction and combination of parts, all as hereinafter described, and pointed out in the appended claim.

Referring to the accompanying drawings, the letter A designates a cylindrical receptacle having a handle B and a perforated bottom $a$.

C designates an agitator or shaker, which consists of a series of radial arms which work within the receptacle in close relation to the bottom $a$, and which are attached to a hub $c$ affixed to a vertical shaft D. Said shaft has a central bearing at its lower end in the bottom $a$ and an upper bearing in an arm E, which extends across the receptacle and is secured to the walls thereof. The upper end portion of the said shaft is bent horizontally and then vertically to form a crank F, to which is connected a link G, the opposite end of which is connected to a second link H, which extends loosely through the wall of the receptacle and along the under side of the handle B. Pivoted to the under side of said handle near the end thereof is a bell-crank lever I, whose horizontal arm is concaved on its upper surface to fit the handle and is broadened to form a good bearing for the fingers.

J is a link which connects the vertical arm of said lever with the link G.

K is a spring, one arm of which is secured to the inner wall of the receptacle and the other arm of which has a bearing against the vertical arm of the crank F, between collars $f$ thereon. The tension of this spring is such as to throw the crank F away from the handle, with the bell-crank in raised position.

In operation it will be apparent that the alternate action of the fingers and the spring will cause the agitation partial rotation, first in one direction and then in the other, whereby the material is pulverized and forced through the perforations of the bottom $a$.

Having thus described my invention, what I claim as new, and desire to secure by Letters Patent, is—

The herein described plant duster, comprising a receptacle having a perforated bottom and a handle, an agitator comprising a series of radial arms which are arranged to work in close relation to said bottom, a vertical shaft journaled within the receptacle and to which said arms are fastened, said shaft having its upper portion bent horizontally and vertically to form a crank, a spring secured within the receptacle and having an arm which bears against the vertical arm of said crank, a bell crank lever pivotally secured to the under side of the handle, and links connecting one arm of said lever with the vertical arm of said crank, substantially as specified.

In testimony whereof I affix my signature in presence of two witnesses.

JACOB B. HYZER.

Witnesses:
EDWARD M. HYZER,
J. L. MAHONEY.